July 29, 1958  O. THIEL  2,844,922
APPARATUS FOR FINISHING A SURFACE OF A WORK PIECE
Filed July 20, 1953  3 Sheets-Sheet 1
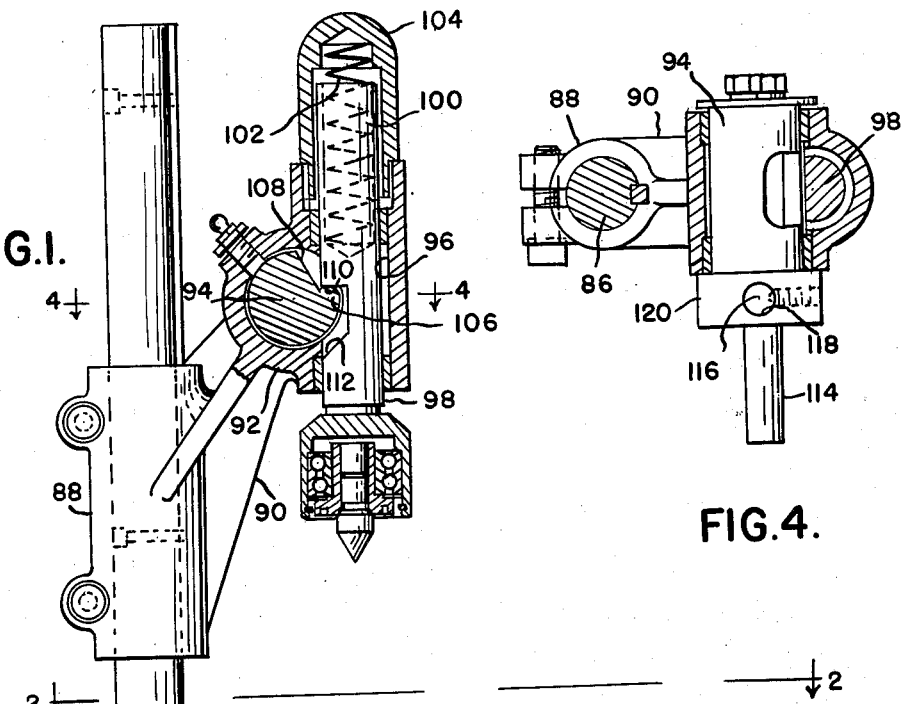
FIG.1.
FIG.4.
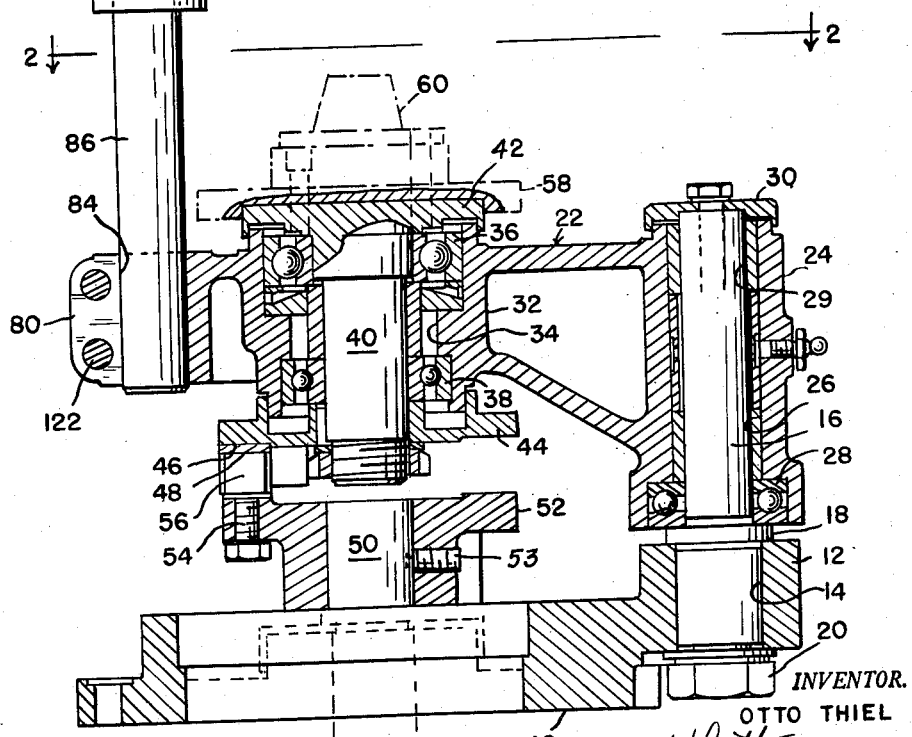
INVENTOR.
OTTO THIEL
BY *Whittemore,*
*Hulbert & Belknap*
ATTORNEYS

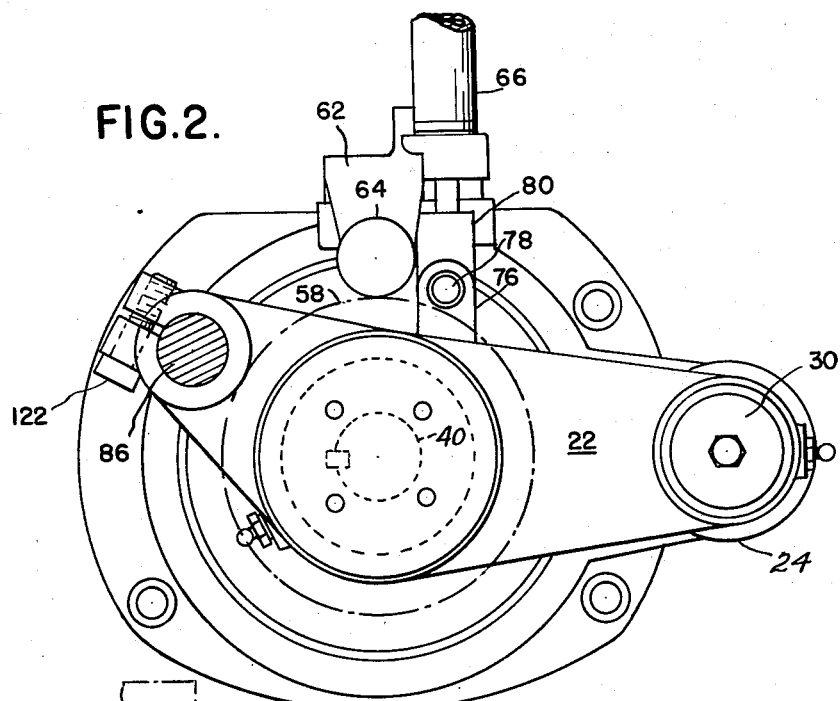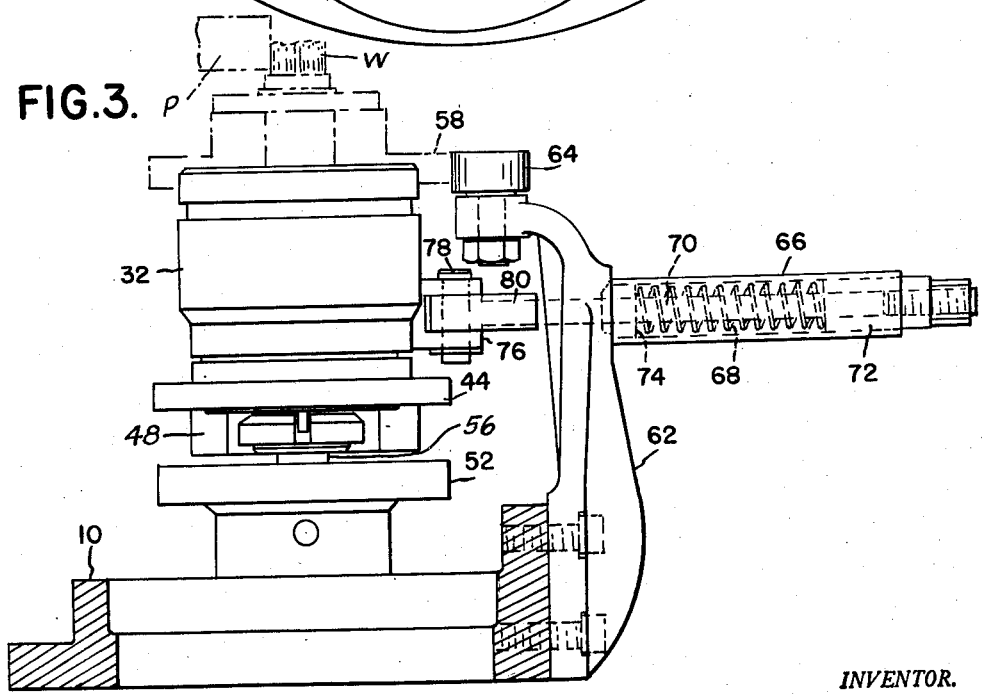

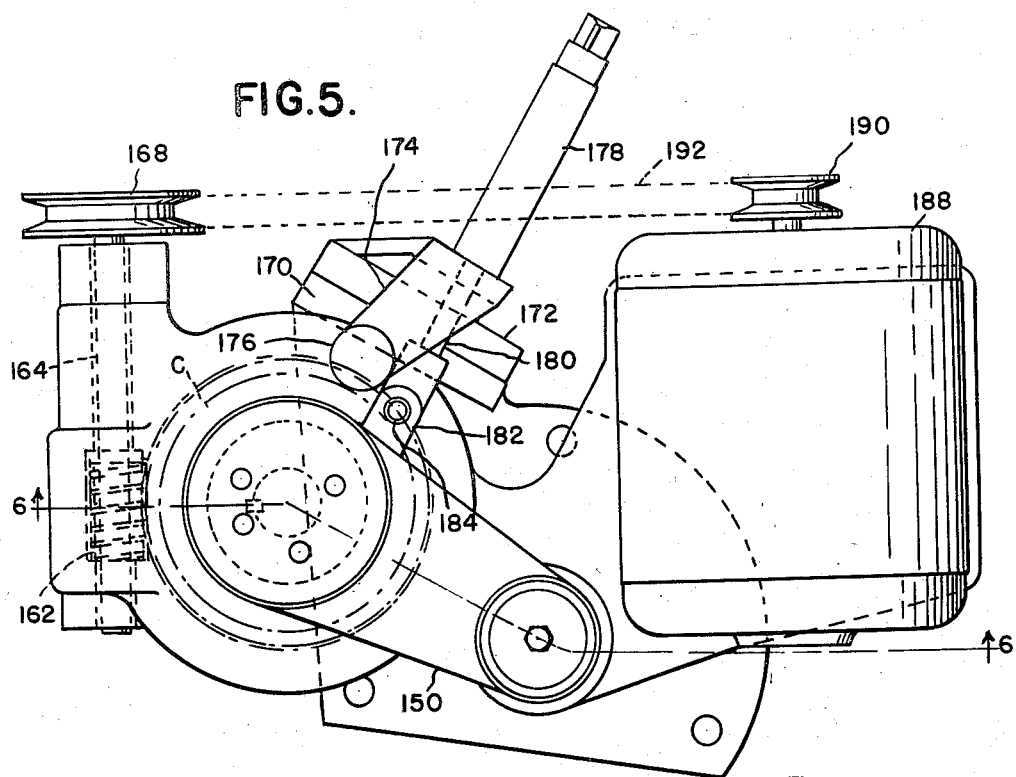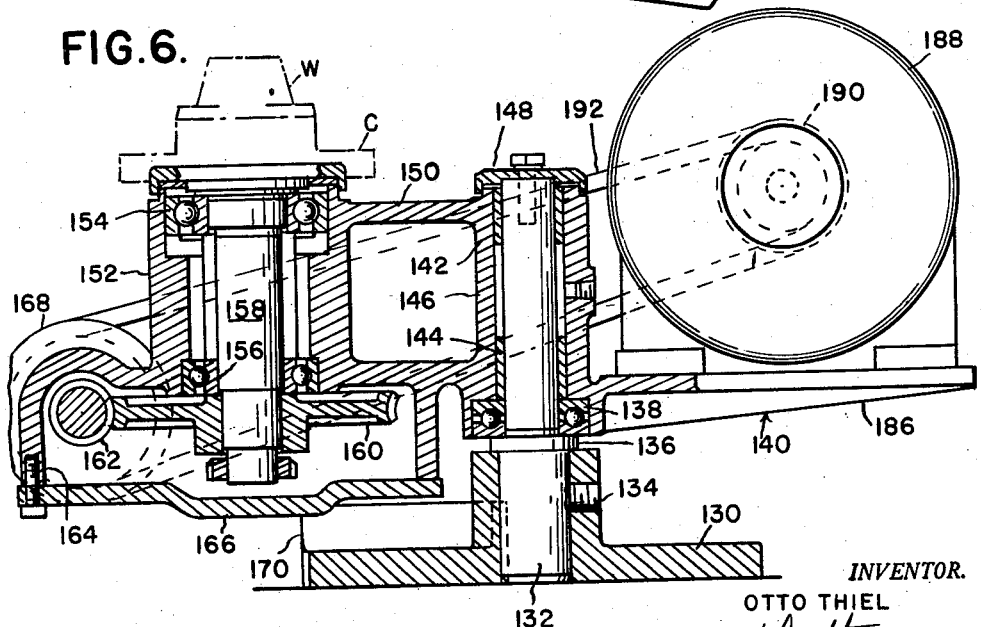

United States Patent Office 2,844,922
Patented July 29, 1958

2,844,922

APPARATUS FOR FINISHING A SURFACE OF A WORK PIECE

Otto Thiel, Detroit, Mich., assignor to Midwest Supply and Manufacturing Company, Ferndale, Mich., a corporation of Michigan Application July 20, 1953, Serial No. 369,106

8 Claims. (Cl. 51—234)

The present invention relates to apparatus for finishing a surface of a work piece.

The invention is illustrated and described as used in conjunction with a polisher adapted to polish or finish an irregular surface of a work piece. Briefly described, the invention comprises a rotary support for a work piece which is mounted for limited movement in a direction perpendicular to its axis, and means for moving the work piece in rotation and simultaneously moving the work piece in a direction perpendicular to its axis in accordance with the surface of the work piece.

It is an object of the present invention to provide work supporting means adapted to rotate a work piece about an axis of rotation and simultaneously oscillate the work piece back and forth in a direction perpendicular to its axis of rotation, the movement of the work piece in the direction perpendicular to its axis being controlled in accordance with surface irregularities of the work piece.

More specifically, it is an object of the present invention to provide, in apparatus of the character described, a work support arm mounted for oscillating movement about a first fixed axis, a work spindle parallel and spaced from said fixed axis, a cam carried by said work spindle, a stationary cam follower disposed to engage said cam and to effect swinging oscillation of said arm in accordance with rotation of said work spindle, and means for rotating said work spindle in all positions thereof.

More specifically, it is an object of the present invention to provide mechanism as described in the preceding paragraph in which work drive means comprising a stationary rotary driver is provided, the axis of such driver being coincident with the axis of said work spindle when said work spindle is in a position intermediate its limiting positions, and means coupling said driver to said spindle.

It is a further object of the present invention to provide apparatus as described in the preceding paragraph in which the means coupling said driver to said spindle comprises a pin and slot connection therebetween, effective to transmit rotary driving force to the spindle irrespective of alignment between such spindles.

Other objects and features of the invention will become apparent as the description proceeds, especially when taken in conjunction with the accompanying drawings, wherein:

Figure 1 is a front elevation partly in section of the work supporting mechanism.

Figure 2 is a section on the line 2—2, Figure 1.

Figure 3 is a fragmentary side elevation, viewed from the right of Figure 1, of a part of the work supporting structure, with parts in section.

Figure 4 is a section on the line 4—4, Figure 1.

Figure 5 is a plan view of a second embodiment of the invention.

Figure 6 is a section on the line 6—6, Figure 5.

Referring now to the drawings, there is illustrated mechanism for supporting a work piece which is adapted to be rotated about an axis of rotation and at the same time oscillated back and forth in a direction generally perpendicular to its axis of rotation, the oscillation of the work piece being controlled in accordance with surface irregularities thereof. The apparatus is intended to support a work piece in position to be engaged by finishing apparatus such for example as a polisher or the like. The work support operates to control the position of the work piece in accordance with its rotation so that the surface portions thereof adjacent the polishing head or wheel are properly disposed to be engaged thereby.

As seen in the figures, the work supporting structure comprises a base 10 which is adapted to be rigidly secured to a supporting table or other structure. It is contemplated that a plurality of work supporting devices may be assembled into a single machine including a rotary table or the like to which the bases are fixed so that work pieces carried thereby will be advanced intermittently past a stationary polishing device.

The base 10 includes a laterally extending boss 12 having an aperture 14 therethrough in which is mounted a vertical pivot shaft 16, the shaft being illustrated as having a radial flange 18 adapted to rest upon the upper surface of the enlargement 12. The lower end of the shaft 16 is threaded and receives a clamping nut 20.

Mounted for swinging movement on the pivot shaft 16 is an arm 22 having an enlargement 24 provided with a cylindrical bore 26 receiving the upper end of the shaft 16. At its lower end the enlargement 24 is recessed to receive thrust bearing structure indicated generally at 28 and it is also provided with bearings 29. At its upper end the shaft 16 has secured thereto a cover piece 30. Intermediate its ends the arm 22 is provided with a second enlargement 32 having a stepped opening 34 extending therethrough in which are received bearing devices 36 and 38. Mounted for rotation in the bearing devices 36 and 38 is a work spindle 40 having a radially extending flange 42 at its upper end adapted to overlie and form a closure for the upper end of the stepped opening 34. At is lower end the work spindle 40 has keyed or otherwise secured thereto an annular member 44 which is recessed as indicated at 46 and receives a downwardly open U-shaped shoe 48 formed of hardened material.

Extending upwardly through an opening in the stationary base 10 is a drive shaft 50 adapted to be driven by suitable work drive mechanism (not shown). A driver 52 is connected by a set screw 53 to the upper end of the shaft 50 above the base 10 the driver 52 carrying a pin 54 to the upper end of which is secured a roller 56 which is received within the slot provided by the inverted U-shaped shoe 48. This type of crank drive is a simple, efficient and practical one.

At the upper end of the spindle 40 a cam 58 is secured to the flange 42 and above the cam is a work supporting member 60. The work supporting member 60 will be appropriately formed to receive a work piece and the contour of the cam will be shaped in accordance with the desired shape of the finished work piece.

Also carried by the base 10 (Figure 3) is an upwardly extending bracket 62 to the upper end of which is secured a stationary roller 64 in position to engage the outer periphery of the cam 58. The bracket 62 also carries a stationary tubular spring sleeve 66 which receives a compression spring 68. Slidably mounted within the sleeve 66 is a rod 70 having a head portion 72 against which the outer end of the spring engages. Preferably, the head 72 is threaded to the rod so as to provide for adjustment of the compression of the spring 68. At its inner end the sleeve 66 is provided with an apertured spring seat 74 through which the rod 70 extends.

Extending outwardly from the enlargement 32 of the arm 22 are apertured ears 76 which receive a pivot pin 78 pivotally securing thereto a head 80 fixedly carried at the inner end of the rod 70. As a result of the foregoing construction the spring 68 establishes a resilient force urging the arm 22 in a clockwise direction as seen in Figure 2, thereby urging the cam 58 into engagement with the stationary cam follower 64.

In some cases it may be desirable to provide a tailstock for the work piece and in such case the arm 22 includes an end portion 80 which is provided with an opening 84 receiving a vertical support 86. Slidably mounted on the support 86 is a sleeve 88 having an arm 90 provided with an enlargement 92 having a cylindrical opening therein in which is received a rotary actuator 94. The enlargement 92 also includes a vertical cylindrical opening 96 in which is mounted a shaft 98. The upper end of the shaft is recessed as indicated at 100 and receives a compression spring 102, the upper end of which bears against a cap 104. The actuator 94 is shaped as illustrated in Figure 1, to provide a camming lobe 106 which connects with a straight portion 108. The shaft 98 has a transverse recess therein having an upper flat surface 110 and a lower inclined surface 112.

The actuator 94 has connected to one end thereof a crank 114. The crank 114 includes an angularly disposed end portion 116 clamped within an opening 118 in a collar 120, the collar forming a portion of the actuator 94.

It will be observed that the entire tail support structure is carried by an arm 22 and is therefore movable with the work support 60. In cases where the work support is of a character such that it does not require the use of the tail support, the entire tail support assembly may be removed by loosening clamping screws 122, the enlargement 80 being split longitudinally for cooperation with such clamping screws. From the foregoing construction it will be apparent that the work support may be rotated about its axis and at the same time given a back and forth oscillation in accordance with an irregular lateral surface of the work piece. By this means the surface of the work piece may be moved so as to maintain at all times a proper relationship to a polishing wheel or the like. The cam 58 will of course be shaped in accordance with the lateral surface configuration of the work piece. By way of example, it is possible by the present apparatus to control the movement of the work piece so that irregular work pieces, such for example as a work piece W of substantially square cross-section, as depicted in broken lines in Figure 3 may have its surface finished by a stationary polishing wheel P or the like.

Referring now to Figures 5 and 6 there is illustrated a second embodiment of the invention. In this case there is illustrated a base 130 having a pivot shaft 132 extending upwardly therefrom and secured in place by a screw 134. Located above a flange 136 on the shaft is a load supporting bearing 138 on which is mounted a frame 140. Bearings 142 and 144 mount the frame on the upper end of the shaft 132 for swinging movement, these bearings being received within a tubular portion 146 of the frame, the upper end of which is closed by a removable cap 148. The frame 140 comprises a first arm 150 terminating at its outer end in a sleeve 152 in which are received bearings 154 and 156 which mount a spindle 158 for rotation. The lower end of the spindle 158 has keyed or otherwise secured thereto a worm gear 160 which meshes with a worm 162, both of these parts being received within a housing portion 164 closed by a removable plate 166. The worm 162 is mounted on a shaft 164 to the outer end of which is secured a sheave 168.

The spindle 158 is adapted to mount a work piece indicated at W and an associated cam C, the cam being designed to conform to the desired shape of the finished work piece as previously described in conjunction with the embodiment of the invention illustrated in Figure 3.

The base 130 is provided with an upwardly extending flange 170 to which is secured a bracket 172 mounting an arm 174 carrying a cam follower roller 176 and a spring housing 178 containing a spring and a link 180 connected to ears 182 on the arm 150 as by a pivot pin 184. This construction, as in the embodiment previously described, biases the arm carrying the work piece W toward the cam follower 176 and causes the cam C to continuously bear against the roller 176.

The frame 140 includes a platform or support part 186 on which a motor 188 is mounted, the motor including a driving sheave 190 adapted to be connected to the sheave 168 by a belt or the like as indicated at 192.

Obviously, the motor is thus adapted to drive the worm 162 and hence to effect a relatively slow rotation of the work support, the work piece W, and the cam C. As the spindle 158 is rotated the cam C will cause horizontal swinging movement of the arm 150 so as to position successive peripheral surface portions of the work piece W for engagement with a grinding wheel, polishing wheel, or the like. It will be appreciated that if the work piece had a cylindrical peripheral surface, the cam would be of circular cross-section. If however, for example, a work piece of square cross-section were presented the cam C would be generally square in outline but specifically modified to cause appropriate movement of the work piece W to present successive surface portions thereof in proper manner to the tool.

Obviously, instead of connecting the motor 188 to the work spindle by a driving belt, it might be mounted more nearly adjacent the work spindle and secured thereto by suitable gearing. However, the illustrated construction is preferred since it is designed so as to produce a balanced structure with respect to the axis of the shaft 132.

It will of course be appreciated that the rotation imparted to the work piece is a relatively slow rotation so that rotation of the cam does not develop sufficient momentum to cause the cam to depart from the cam follower. The rotation of the work piece may be regarded as a feeding rotation to distribute the action of the polishing or abrading tool progressively around the work piece, the polishing or abrading action being the result of substantially more rapid surface movement of the tool.

The drawings and the foregoing specification constitute a description of the improved apparatus for finishing a surface of a work peice in such full, clear, concise and exact terms as to enable any person skilled in the art to practice the invention, the scope of which is indicated by the appended claims.

What I claim as my invention is:

1. In apparatus for finishing a surface of an irregular work piece, a base, an arm carried by said base for oscillating movement about a first fixed axis, a work support on said arm comprising a rotary spindle provided with a work holder adjacent one end thereof and having its axis parallel to said first fixed axis, work drive means on said base comprising a driver mounted adjacent the opposite end of said spindle for rotation about a second fixed axis parallel to said first fixed axis, and spaced therefrom a distance substantially equal to the spacing between said first fixed axis and the axis of said work support, means adjacent said first named spindle end for oscillating said arm to one side of a position in which the axis of said work support is in alignment with said second fixed axis, and means coupling said driver to said spindle to drive said work spindle in rotation as said arm is oscillated.

2. Apparatus as defined in claim 1 in which the means for oscillating said arm comprises a cam connected to said spindle for rotation therewith.

3. Apparatus as defined in claim 2 which comprises a cam follower rigidly mounted on said base and disposed to engage said cam at a point angularly displaced from a line joining said first fixed axis and the axis of said spindle, and resilient means connecting said arm to said base tending to swing said arm in a direction to keep said cam against said cam follower.

4. Apparatus as defined in claim 1 in which the means coupling said driver to said spindle comprises a pin and slot connection.

5. Apparatus as defined in claim 4 in which said slot is disposed radially of its axis of rotation.

6. In apparatus of the character described, a rotary work spindle, a work support carried by said spindle adjacent one end thereof, a cam carried by said spindle adjacent said work support end thereof, means mounting said spindle for movement in a direction generally perpendicular to its axis, a stationary cam follower disposed to engage said cam, resilient means urging said cam against said cam follower, and drive means for said work spindle operatively connected to the end thereof opposite said work support end, said drive means comprising a rotary driver, and means coupling said driver to said spindle during movement of said spindle perpendicular to its axis, said cam being shaped to produce limited back and forth movement of said spindle, said driver having its axis of rotation intermediate limiting positions of said spindle axis and substantially coaxial therewith when said spindle is in an intermediate position, said coupling means comprising a pin and slot connection between said driver and said spindle.

7. Apparatus as defined in claim 6, in which said slot extends generally radially of the axes of said driver and spindle when these axes are in alignment.

8. In apparatus of the character described, a rotary work spindle, a work support carried by said spindle adjacent one end thereof, a cam carried by said spindle adjacent said work support end thereof, means mounting said spindle for movement in a direction generally perpendicular to its axis, a stationary cam follower disposed to engage said cam, resilient means urging said cam against said cam follower, and drive means for said work spindle operatively connected to the end thereof opposite said work support end, said drive means comprising a rotary driver, and means coupling said driver to said spindle during movement of said spindle perpendicular to its axis, said cam being shaped to produce limited back and forth movement of said spindle, said driver having its axis of rotation intermediate limiting positions of said spindle axis and substantially coaxial therewith when said spindle is in an intermediate position, said coupling means comprising a crank rotatable with said driver and connecting the latter to said spindle.

References Cited in the file of this patent

UNITED STATES PATENTS

| | | |
|---|---|---|
| 138,825 | Weiss | May 13, 1873 |
| 554,797 | Roberts | Feb. 18, 1896 |
| 1,156,323 | Shearer | Oct. 12, 1915 |
| 1,660,291 | Birkigt | Feb. 21, 1928 |
| 1,827,368 | Maynard | Oct. 13, 1931 |
| 2,043,810 | Prickett | June 9, 1936 |
| 2,107,578 | Onsrud | Feb. 8, 1938 |
| 2,352,608 | Archer | July 4, 1944 |

FOREIGN PATENTS

| | | |
|---|---|---|
| 253,093 | Great Britain | Dec. 23, 1926 |
| 373,693 | Germany | Apr. 14, 1923 |